United States Patent [19]
Murakami et al.
[11] Patent Number: 4,733,251
[45] Date of Patent: Mar. 22, 1988

[54] THERMAL TRANSFER PRINTING

[75] Inventors: Sadatoshi Murakami; Satoru Yamasaki, both of Fukuyama; Masaru Ohnishi, Kamakura; Kenji Nomura, Amagasaki; Masayuki Tanaka; Sayoko Hirata, both of Fukuyama, all of Japan

[73] Assignee: Mitsubishi Denki Kabushiki Kaisha, Tokyo, Japan

[21] Appl. No.: 69,607

[22] Filed: Jul. 2, 1987

[30] Foreign Application Priority Data

Jul. 2, 1986 [JP] Japan ............................... 61-156531

[51] Int. Cl.[4] ............................................ G01H 15/10
[52] U.S. Cl. ................................ 346/76 PH; 346/105
[58] Field of Search .......................... 346/76 PH, 105; 400/120, 241; 219/216 PA; 428/320.2

[56] References Cited

U.S. PATENT DOCUMENTS 4,527,171 7/1985 Takanashi et al. ............. 346/76 PH
4,590,486 5/1986 Yana ............................... 346/76 PH

FOREIGN PATENT DOCUMENTS 56-123877 9/1981 Japan .
60-23079 2/1985 Japan .
60-25781 2/1985 Japan .

OTHER PUBLICATIONS

"A Basic Study of Thermal Transfer Printing for Improvement of Print Quality", by Ando et al., Rohm Co., Ltd, Japan.

*Primary Examiner*—Arthur G. Evans
*Attorney, Agent, or Firm*—Birch, Stewart, Kolasch & Birch

[57] ABSTRACT

A thermal transfer printing method which is performed by the use of a thermal printer including a platen, a thermal print head having at least one heating element and a length of ink carrier ribbon with the recording medium positioned between the thermal print head and the length of ink carrier ribbon, which ink carrier ribbon having a base film and an ink layer, which method includes the steps of pressing the ink carrier ribbon against the platen by the thermal print head with the ink layer brought in contact with the recording medium, heating the heating element to cause that portion of the ink layer, which is aligned with the heating element, to fuse, and causing that portion of the ink layer so fused to partially transfer onto the recording medium when a cohesive force acting internally of the ink layer becomes smaller than an adhesive force acting between the ink layer and the recording medium and, at the same time, smaller than a adhesive force acting between the ink layer and the base film, whereby the cohesive force is substantially destroyed so as to permit the thickness of the ink layer to be substantially split into halves such that one of the halves is transferred onto the recording medium and the other of the halves remains adhering to the base film.

16 Claims, 18 Drawing Figures

THERMAL TRANSFER PRINTING

BACKGROUND OF THE INVENTION

1. Field of the Invention

The present invention relates to the art of thermal transfer printing of a type designed to effect a printing with the use of a thermal print head for transferring a thermally transferable ink from an ink carrier ribbon onto a recording medium such as, for example, paper.

2. Description of the Prior Art

With the advent of the age of widespread use of computers, particularly personal computers, the use of electrothermal matrix printers or dot matrix printers is currently increasing as a computer output device that provides a hard copy of a text. Of these electrothermal matrix printers, an electrothermal transfer printer is also known as a non-impact matrix printer and utilizes a thermal print head operable to transfer a thermally fusible ink from an ink carrier ribbon onto a recording medium while the thermal print head moves along a line being printed. The electrothermal transfer printer can also be operable without the ink carrier ribbon if the recording paper used in connection therewith is a heat sensitive paper which exhibits a color rendering capability when heated.

The conventional electrothermal transfer printer and the printing method performed thereby, both being disclosed in, for example, the Japanese Laid-open Patent Publication No. 56-123877, published in 1981, will now be discussed with reference to FIGS. 8 to 10 of the accompanying drawings.

The electrothermal transfer printer particularly shown in FIG. 8 comprises a cylindrical platen 1 supported for intermittent rotation about its own longitudinal axis and drivingly coupled with a drive motor as is well known to those skilled in the art, a recording paper 2 being transported around the platen 1 in synchronism with the intermittent rotation of the platen 1. The thermal printer also comprises a thermal print head 3 mounted on a carriage 4 for movement together therewith in a direction parallel to the longitudinal axis of the platen 1 and also for movement between operative and inoperative positions in a direction both towards and away from the platen 1, respectively, and a carriage transport mechanism generally identified by 10. The carriage 4 has a pair of spindles for the support thereon of respective reels to which opposite ends of a length of ink carrier ribbon 7 are secured, a substantially intermediate portion of the length of ink carrier ribbon 7 being wound around one or both of the reels 5 and 6. In practice, the spindles for the support thereon of the respective reels 5 and 6 are operatively associated with the movement of the carriage 4 and adapted to be alternately brought into engagement with a ribbon drive mechanism during the movement of the carriage 4 so that, when the spindle for the support thereon of the reel 5 is brought into engagement with the ribbon drive mechanism, the length of the ink carrier ribbon 7 can be transported from the reel 6 onto the reel 5 in a direction shown by the arrow X, but when the spindle for the support thereon of the reel 6 is brought into engagement with the ribbon drive mechanism, the length of the ink carrier ribbon 7 can be transported from the reel 5 onto the reel 6 in a direction shown by the arrow Y.

The ink carrier ribbon 7 comprises, as best shown in FIG. 9, a length of heat resistant base film 8 having its opposite ends connected with the respective reels 5 and 6 through associated leaders, and a thermally transferable ink layer 9 deposited over the entire length of the base film 8 on one of the opposite surfaces of the base film 8 which, when in use, confronts the platen 1.

Although not shown, a portion of the length of ink carrier ribbon 7 extending between the spaced reels 5 and 6 are, or may be, guided by one or more guide rollers rotatably mounted on the carriage 4.

The carriage transport mechanism 10 includes driven and drive pulleys 12 and 13 rotatably mounted on a base of a printer framework and spaced a distance enough to permit the thermal print head 3 to move from one end to the opposite end of the platen 1 together with the carriage 4, and an endless drive belt 11 trained around the driven and drive pulleys 12 and 13, one of the opposite runs of the endless drive belt 11 being fixed to the carriage 4 so that the movement of the endless drive belt 11 can result in the corresponding movement of the carriage 4. The drive pulley 13 is drivingly coupled with an electric reversible motor 14 so that the carriage 4 can be reciprocatingly moved between start and end positions in one of the opposite directions shown by the respective arrows a and b.

The thermal printer further comprises a controller 15 utilized to control respective coordinated movements of the electric reversible motor 14, the carriage 4 and the thermal print head 3.

The prior art thermal printer of the above described construction is so designed as to accomplish an actual printing of a particular alphanumeric character in the following manner. It is, however, to be noted that the thermal print head 3 has a heating element, identified by 3*a* in FIG. 9, with dot electrodes embedded therein, which dot electrodes are generally arranged in a vertical row and are adapted to be selectively energized electrically to heat a portion of the heating element 3*a* in a predetermined pattern corresponding to dots or indicia forming parts of a particular character desired to be printed.

When the actual printing is to take place, the thermal print head 3 is brought to a printing position where a particular alphanumeric character is to be printed on the recording paper 2 and is then moved from the inoperative position to the operative position at which the thermal print head 3 presses a portion of the ink carrier ribbon 7 against the recording paper 2 with the thermally transferable ink layer 9 held in tight contact with the recording paper 2. Prior to the movement of the thermal print head 3 from the inoperative position towards the operative position, the carriage 4 may, or may not, be moved in the direction shown by the arrow a in FIG. 8 depending on where the actual printing on the recording paper 2 begins.

No sooner is the thermal print head 3 brought to the operative position, than the heating element 3*a* shown in FIG. 9 is electrically heated according to an electric signal applied through the printer controller 15 and indicative of one or more dots forming parts of the particular alphanumeric character desired to be printed. As a result of the heating of the heating element 3*a*, that portion of the ink layer 9 on the ink carrier ribbon 7 which is then aligned with the heating element 3*a* is fused and transferred onto the recording paper 2. As the thermal print head 3 is moved away from the printing position together with the carriage 4 then moving in the direction parallel to the platen 1 with the length of ink carrier ribbon 7 separating progressively away from the recording paper 2, that portion of the ink layer 9 which has been so transferred onto the recording paper 2 forms, upon solidification, an ink deposit permanently fixed on the recording paper 2, as indicated by 9*a* in FIG. 9, while leaving a consumed area 9*b* on the base film 8 also as shown in FIG. 9. An aggregation of ink deposits 9*a* so formed may be an image of, or a part of the image of, the particular alphanumeric character.

The above described printing takes place while the carriage 4 is moved in the direction of the arrow a and, at the same time, the length of ink carrier ribbon 7 is transported from the reel 6 towards the reel 5 in a direction shown by the arrow X in FIG. 8. When a line of alphanumeric characters have been printed with the carriage 4 consequently brought to a right-hand position, the drive motor 14 is reversed to effect a return of the carriage 4 back to a left-hand position with the endless drive belt 11 moved in a direction shown by the arrow b. During the return movement of the carriage 4, the thermal print head 3 is moved from the operative position back to the inoperative position with the length of ink carrier ribbon 7 being kept away from the recording paper 2 and, at the same time, the transportation of the length of ink carrier ribbon 7 from the reel 6 towards the reel 5 is interrupted.

As hereinbefore described, the actual printing is carried out by heating the heating element 3*a* to permit that portion of the ink layer 9 to be thermally transferred from the base film 8 onto the recording paper 2 while that portion of the length of ink carrier ribbon 7 is pressed by the thermal print head 3 in the operative position against the recording paper 2 with the ink layer 9 held in contact therewith. During this actual printing, the heating element 3*a* of the thermal print head 3 is heated, in response to a drive signal fed from a drive circuit, to generate heat in a pattern corresponding to the image of the particular alphanumeric character with the resultant Joule heat transmitted to the ink layer 9 through the heat resistant base film 8 to fuse and then transfer that portion of the ink layer 9 onto the recording paper 2, that portion of the ink layer 9 so transferred being subsequently solidified to form the ink deposit 9*a* on the recording paper 2.

According to the prior art printing method as hereinbefore discussed, since that portion of the ink layer 9 fused by the heating element 3*a* is, before it is completely transferred onto the recording paper 2 to form the ink deposit 9*a*, separated from the interface of the base film 8 as a lump of ink material, that is, the interface separation takes place between the ink layer 9 and the base film 8, the consumed area 9*b* which has been left on the base film 8 as a result of the thermal transfer of the ink layer 9 onto the recording paper 2 in the manner as hereinabove described can no longer be used for the subsequent printing. Moreover, when the ink carrier ribbon 7 has been completely used from one end to the opposite end, the length of base film 8 still may have unconsumed fragments of the ink layer 9 each bound between the neighboring consumed area 9*b* as shown by 9*c* in FIG. 9, which unconsumed fragments of the ink layer 9 are unnecessarily discarded.

In any event, the interface separation referred to above will now be discussed in detail with particular reference to FIGS. 10*a* and 10*b* which illustrate exaggeratedly how that portion of the ink layer 9 is transferred onto the recording paper 2. In these figures, $\tau$ II represents the cohesive force acting in the ink layer 9 to hold ink particles together, $\tau$ IB represents the adhesive force acting between the ink layer 9 and the base film 8, and $\tau$ IP represents the adhesive force acting between the ink layer 9 and the surface of the recording paper 2.

Referring first to FIG. 10*a*, in the case where the recording paper 2 is of a type having a surface smoothness of 100 seconds as measured according to the Japanese Industrial Standards (JIS), which paper may be regarded as having a substantially specular surface, the ink deposit 9*a* formed by the portion of the ink layer 9 having been transferred onto the recording paper 2 as a result of the heating of the heating element 3*a* of the thermal print head 3 substantially completely sticks to the surface of the recording paper 2. Accordingly, at the time of separation of that portion of the ink layer 9 from the base film 8, the following relationships are simultaneously established, and that portion of the ink layer 9 is accordingly completely released from the base film 8 to accomplish the interface separation.

$$\tau\ \mathrm{IP} > \tau\ \mathrm{IB} \text{ and } \tau\ \mathrm{II} > \tau\ \mathrm{IB}$$

In particular, the relationship of $\tau$ II $>$ $\tau$ IB is attributable to the fact that the ink deposit 9*a* on the recording paper 2 is fixed thereto as a result of that transferred portion of the ink layer 9 having been solidified. Also, while that transferred portion of the ink layer 9 is firmly retained in position on the surface 2*a* of the recording paper 2 by means of, for example, a well known capillary phenomenon, the ink layer 9 on the base film 8 is not retained by the base film 8 so firmly as the ink deposit 9*a* on the recording paper 2 and, therefore, the relationship of $\tau$ IP $>$ $\tau$ IB is in fact established.

Since unconsumed fragments 9*c* of the ink layer 9 each bound between the neighboring consumed area 9*b* on the base film 8 can no longer be used for the subsequent cycle of printing, the reeled ink carrier ribbon is unnecessarily disposed of.

In any event, that portion of the ink layer 9 which eventually forms the ink deposit 9*a* on the recording paper 2 has been more or less firmly interconnected with the film base 8 although it is not so hard as the ink deposit 9*a* interconnected with the recording paper 2. Accordingly, during a high speed printing with the carriage 4 traversing the recording paper 2 at a relatively high speed, the timing at which the ink carrier ribbon 7 being transported is separated away from the recording paper 2 turned around the platen 1 tends to be delayed with the point of separation occurring at a location spaced a distance from the actual printing position on the trailing side with respect to the direction of movement of the carriage 4 as shown in FIG. 11. Therefore, the length of ink carrier ribbon 7 tends to be slackened with the take-up reel consequently failing to wind up the length of ink carrier ribbon 7 properly. In view of this, such a high speed printing at a rate of, for example, 2 to 12 msec. per dot cannot be performed without difficulty.

On the other hand, in the case of the recording paper 2 having a surface smoothness of a few seconds according to JIS, which paper has a surface 2*a* with surface irregularities such as exaggeratedly shown in FIG. 10*b*, it has been found difficult to accomplish a uniform sticking of that thermally transferred portion of the ink layer 9 on the surface 2*a* of the recording paper 2. This is particularly true during the high speed printing because, even though the ink layer 9 is brought in contact with the surface 2*a* of the recording paper 2 as pressed by the thermal print head 3 through the base film 8, that portion of the ink layer 9 thermally separated from the base film 8 and being transferred onto the recording paper 2 tends to be quickly cooled to solidify before it penetrates sufficiently into some irregularities on the surface *2a* of the recording paper 2. Specifically, in the case of the recording paper 2 having the rough surface as shown in FIG. 10*b*, that portion of the ink layer 9 transferred from the base film 8 deposits and subsequently solidifies on hill portions 2*a*1 forming parts of the surface irregularities on the surface *2a* of the recording paper 2 without penetrating into dale portions 2*a*2 also forming parts of the same surface irregularities.

The above described phenomenon is discussed in detail in a paper entitled "A BASIC STUDY OF THERMAL TRANSFER PRINTING FOR IMPROVEMENT OF PRINT QUALITY" written by S. Ando et al. of Rohm Co., Ltd. of Japan, which paper was made available to the assignee of the present invention about March, 1985.

In view of the foregoing, at the time of separation of that portion of the ink layer 9 from the base film 8, the following relationships can be simultaneously observed at the hill portions 2*a*1 of the rough surface 2*a* of the recording paper 2 and, accordingly, fragments 9*a*P of the ink layer 9 are released from the base film 8 to accomplish the interface separation.

$$\tau IP > \tau IB \text{ and } \tau II > \tau IB$$

On the other hand, at the dale portions 2*a*2 of the rough surface of the same recording paper 2, the following relationships can be simultaneously observed:

$$\tau IP < \tau IB \text{ and } \tau II > \tau IB$$

and the relationships of $\tau IP > \tau IB$ and $\tau II > \tau IB$ are no longer observed, with the consequence that fragments 9*a*B of that portion of the ink layer 9 remain on the base film 8 without being released therefrom. Once this happens, as shown in FIG. 10*c*, the printing quality tends to be deteriorated in such a way that the printed dots partially drop out and/or lacks the clarity, and, therefore, with the prior art printing method, the printing speed is limited and/or a high quality printing cannot be accomplished with papers other than the paper having a surface smoothness of about 100 seconds as measured according to JIS.

The prior art thermal transfer printing involves additional problems. By way of example, the outermost surface of the ink deposit 9*a* formed by the portion of the ink layer 9 having been thermally transferred onto the recording paper 2 is very smooth as if it were mirror-polished, in complementary relationship with the surface of the base film 8 to which it had adhered. Accordingly, when a reader reads a text full of characters delineated by the smooth ink deposits, the smooth ink deposits on the paper altogether reflect rays of light impinging thereupon, tending to accelerate fatique in the eyes of a reader.

Also, after the length of ink carrier ribbon 7 has been used for printing with the ink layer 9 having been transferred onto the recording paper at plural locations lengthwise of the ink carrier ribbon 7, it is usual that the base film 8 bears negative imprints (such as markings of the ink deposits 9*a* left on the base film 8) of characters which are complementary with the characters printed on the recording paper as positive imprints. Accordingly, the ink carrier ribbon now commerically available is not desirable in terms of the security of information and/or utmost care is required to dispose of the used ink carrier ribbon lest the printed information should be revealed to unauthorized persons.

In order to attain, inter alia, a high quality printing, some improvements have hitherto been made such as disclosed in, for example, the Japanese Laid-open Patent Publication No. 60-23079, published Feb. 5, 1985, and the Japanese Laid-open Patent Publication No. 60-25781, published Feb. 8, 1985.

More specifically, the first mentioned patent publication discloses a method of and a means for allowing the length of ink carrier ribbon to be separated away from the recording paper before the portion of the ink layer having been thermally transferred by the thermal print head onto the recording paper to form the ink deposit is completely solidified. The improvement disclosed in this patent publication is directed to the predecessor wherein the length of ink carrier ribbon has been turned a substantial angular distance around the platen with the recording paper intervening between the angularly curved portion of the ink carrier ribbon and a corresponding portion of the platen.

One method disclosed in this patent publication is to allow the length of ink carrier ribbon to separate away from the recording paper in a direction generally tangential to the circumference of the platen immediately after the thermal transfer of that portion of the ink layer has taken place. The alternative method disclosed therein is the use of a post-heating means disposed on a leading side of the thermal print head with respect to the direction of movement of the length of ink carrier ribbon being taken up, which post-heating means is incorporated in the predecessor of the thermal printer of this patent publication for keeping the thermally transferred portions of the ink layer in a substantially softened state until the length of ink carrier ribbon being taken up is brought to a point of separation from the recording paper.

The purpose of the first mentioned patent publication is obviously to compensate for the difference in a coefficient of thermal expansion between the ink deposits and the recording paper which would constitute a cause of distorted prints particularly where the recording paper has a very smooth surface.

The second mentioned patent publication is directed to minimize the problem associated with the glary print finish on the recording paper. For this purpose, this second mentioned patent publication discloses three different methods. One of these methods is to use the increased temperature of head to be applied to the length of ink carrier ribbon during the actual printing so that that portion of the ink carrier which is applied with heat from the thermal print head for the transfer thereof onto the recording paper can be released partly, not completely, from the base film, the remaining portion being left adhering to the base film.

Another method disclosed in the second mentioned patent publication is to accelerate the separation of the length of ink carrier ribbon away from the recording paper, which takes place subsequent to the actual printing, so that the transfer of that portion of the ink layer can take place in a manner similar to that according to the first mentioned method. The remaining method disclosed in the second mentioned patent publication is to employ as small as possible the angle of separation at which the length of ink carrier ribbon separates away from the recording paper subsequent to the actual printing for the same purpose.

However, a series of experiments conducted by the inventors of the present invention with due regards paid to the disclosure made in any one of the above discussed patent publications have revealed that, even where the length of ink carrier ribbon is allowed to separate away from the recording paper subsequent to the actual printing while the ink deposit remains not completely solidified or in a substantially softened state, the interface separation of that portion of the ink layer from the base film and/or the lack of clarity of the ink deposits or insufficient print quality such as discussed with reference to FIGS. 10*a* and 10*b* occur, posing problems similar to those occurring when the length of ink carrier ribbon is separated away from the recording paper after the ink deposit formed by the transfer of that portion of the ink layer onto the recording paper has been solidified.

SUMMARY OF THE INVENTION

The present invention has, accordingly, been devised with a view to substantially eliminating the above discussed problems inherent in the prior art thermal printing methods and has for its principal object to provide an improved method capable of accomplishing a high speed printing without deteriorating the print quality.

Another important object of the present invention is to provide an improved method of the type referred to above which permits the length of ink carrier ribbon to be used a number of times, thereby contributing to reduction in running cost of the electrothermal printer.

In order to accomplish the above described objects of the present invention, the method herein disclosed is featured in that that portion of the ink layer which has been substantially fused by heat transmitted to a corresponding portion of the length of ink carrier ribbon from the thermal print head is released from the base film when the cohesive force of ink particles in that portion of the ink layer attains a value substantially smaller than the adhesive force acting between that portion of the ink layer and the recording paper and, at the same time, substantially smaller than the adhesive force acting between that portion of the ink layer and that portion of the base film to which said portion of the ink layer has been deposited.

According to the present invention, when the relationships of $\tau$ IP$>\tau$ IB and $\tau$ II$>\tau$ IB discussed hereinbefore are simultaneously established, that is, when the cohesive force of ink particles in that portion of the ink layer attains a value substantially smaller than the adhesive force acting between that portion of the ink layer and the recording paper and, at the same time, substantially smaller than the adhesive force acting between that portion of the ink layer and that portion of the base film to which the portion of the ink layer has been deposited, that portion of the ink layer is partly released from the base film and is then transferred onto the recording paper to form the associated ink deposit, the remaining portion being left adhering to the base film. Accordingly, even though the entire length of ink carrier ribbon has been used for the actual printing of lines of characters, it can be used again for the next succeeding cycle of printing because a portion of the ink layer still remains adhering to the base film over the entire length thereof, without any accompanying substantial reduction in print quality.

At the time that portion of the ink layer is ready to be thermally transferred onto the recording paper, that portion of the ink layer is in a substantially melted state exhibiting a relatively low viscosity and, therefore, the force required to separate the ink carrier ribbon away from the recording paper can be minimized to accomplish the intended high speed printing.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENT

Figure 1:
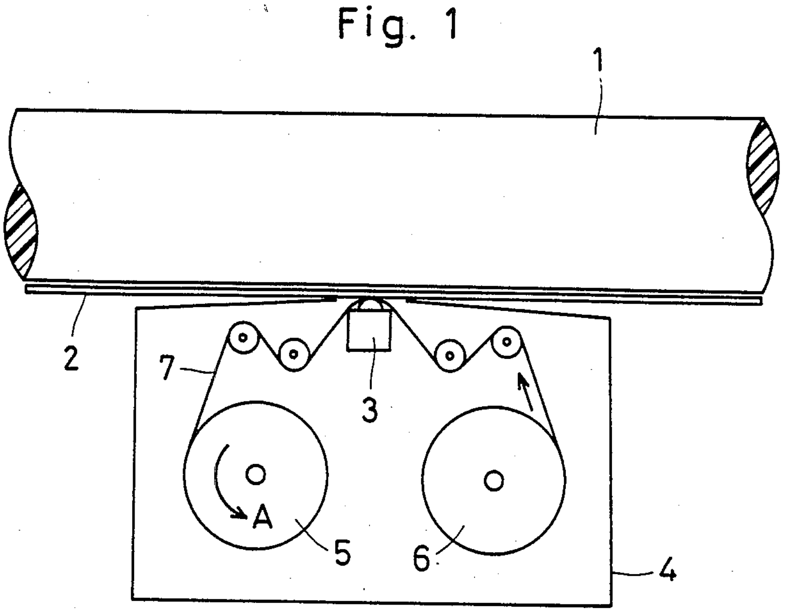
FIG. 1 is a schematic plan view of a portion of a thermal printer utilizable in the practice of the present invention.
Figure 8:
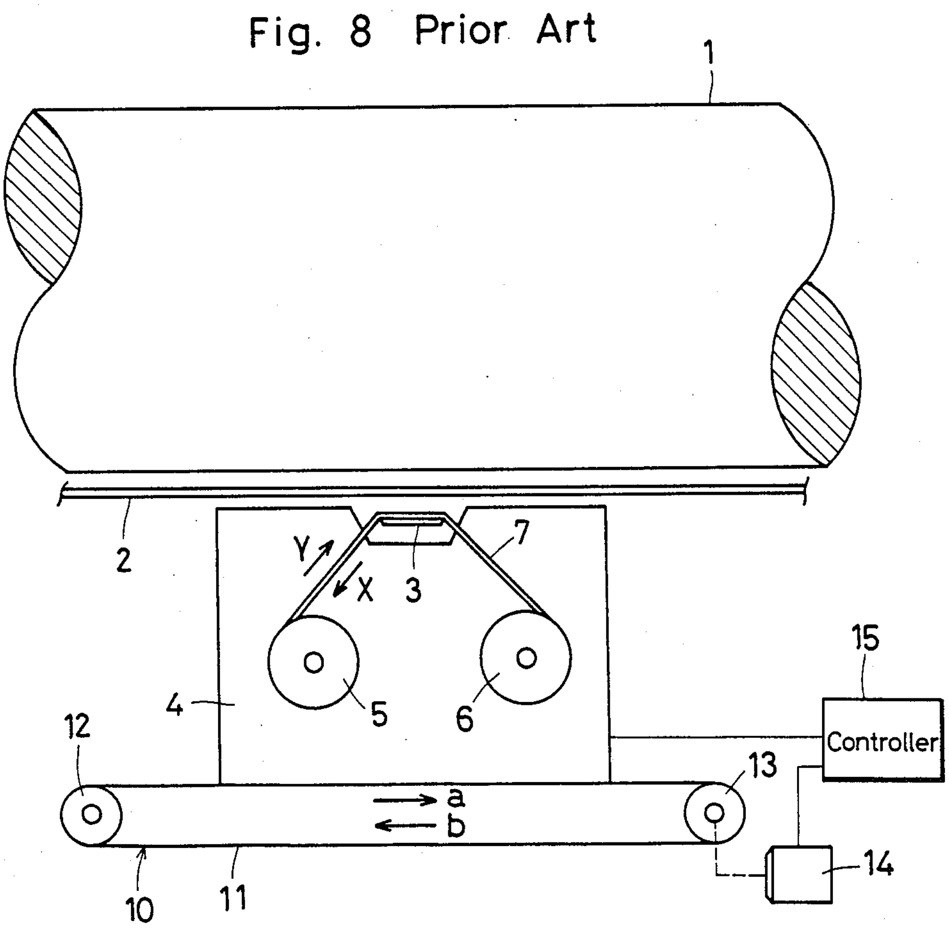
Fig. 8 Prior Art
FIG. 8 is a view similar to FIG. 1, showing the prior art electrothermal printer.

An electrothermal printer which can be utilized in the practice of the present invention is schematically shown in FIG. 1 and is substantially identical with that shown in and described with reference to FIG. 8. Therefore, the details of the thermal printer shown in FIG. 1 will not be reiterated.

Figure 2:
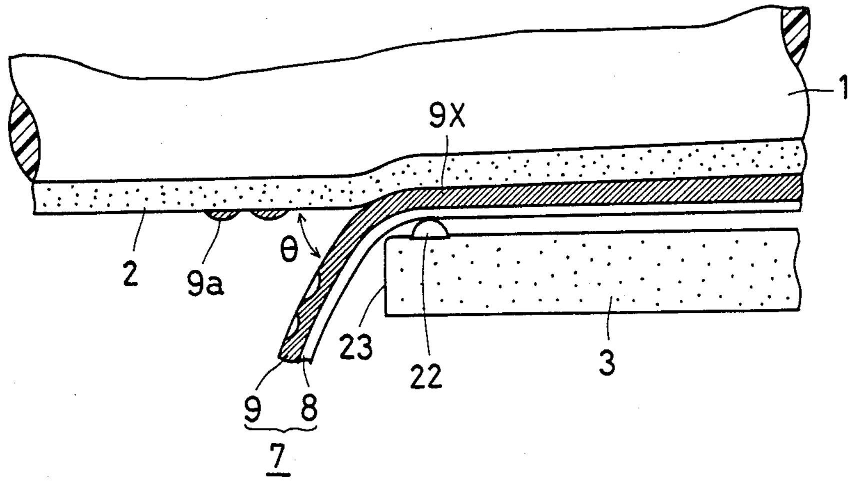
FIG. 2 is a schematic sectional view, on an enlarged scale, showing how an ink layer is transferred onto a recording medium according to the present inveniton.

Referring now to FIG. 2, the ink carrier ribbon 7 utilizable in the practice of the present invention comprises the length of base film 8, made of synthetic resin such as, for example, polyester resin or polyimide resin, and the thermally fusible ink layer 9 deposited on one of the opposite surfaces of the entire length of base film 8. The ink layer 9 has a thickness within the range of, for example, 3 to 20 μm and the base film 8 has a thickness within the range of 2 to 10 μm.

Figure 3A:
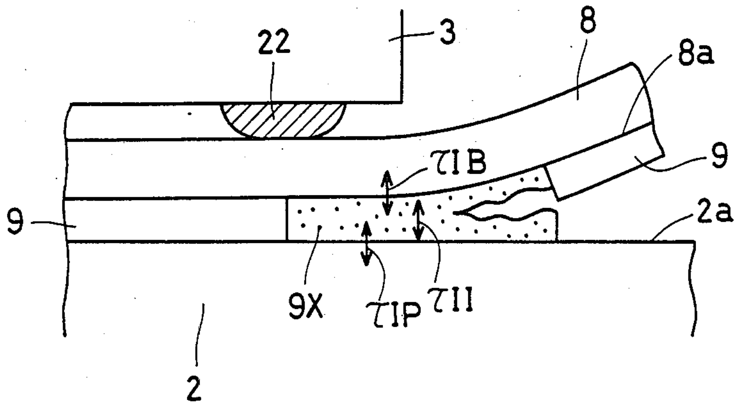
FIGS. 3*a* and 3*b* are explanatory diagrams showing the thermal transfer of a portion of the ink layer according to the present invention when the recording medium is used in the form of a paper having a smooth surface.

As is the case with the conventional thermal printing, the actual printing is carried out by electrically energizing the thermal print head 3, while the latter is pressing the ink carrier ribbon 7 against the recording paper 2 then backed up by the platen 1, to allow a heating element 22 to emit heat in a pattern corresponding to a fraction of the image of the particular character desired to be printed. When the heating element 22 is so heated, the resultant Joule heat is transmitted to the ink layer 9 through the heat resistant base film 8 to heat that portion **9*x* of the ink layer 9 to a melting temperature, for example, 50° C. or higher, thereby fusing that portion 9*x* of the ink layer 9 onto the recording paper 2, that portion 9*x* of the ink layer 9 so transferred being subsequently solidified to form the ink deposit 9*a* on the recording paper 2**.

Where the recording paper 2 used is a paper having a smooth surface of smoothness of 100 seconds or higher as measured according to JIS, that portion **9*x* of the ink layer 9 ready to be transferred and, hence, in a substantially fused state can, as shown in FIG. 3*a*, adhere in part to the recording paper 2 and in part to the base film 8. At this time, the cohesive force $\tau$ II acting in the ink layer 9 to hold ink particles together, the adhesive force $\tau$ IB acting between the ink layer 9 and the base film 8, and the adhesive force $\tau$ IP acting between the ink layer 9 and the surface of the recording paper 2 change over time in respective manners as shown in the characteristic graph of FIG. 5*a* in the light of the change in temperature of all of the recording paper 2, the ink deposit 9*a* and the base film 8 as shown in the graph of FIG. 5*b***.

More specifically, during a period between the timing t0 at which the heating is initiated and the timing t2, the cohesive force $\tau$ II acting in the ink layer 9 to hold ink particles together is greater than the adhesive force $\tau$ IB acting between the ink layer 9 and the base film 8 and also greater than the adhesive force $\tau$ IP acting between the ink layer 9 and the surface of the recording paper 2, the adhesive force $\tau$ IB being greater than the adhesive force $\tau$ IP. Because of this, even when the length of ink carrier ribbon 7 is separated from the recording paper 2 at any time during this period between the timings t0 and t2, that portion **9*x* of the ink layer then fused remains adhering to the base film and, therefore, that portion 9*x* of the ink layer 9** will not be transferred onto the recording paper.

Even when the viscosity of that fused portion of the ink layer 9 is lowered with the passage of time to such a value that the cohesive force $\tau$ II becomes smaller than the adhesive force $\tau$ IB such as occurring during a period between the timings t2 and t3, the adhesive force $\tau$ IB is still greater than the adhesive force $\tau$ IP. Accordingly, when the length of ink carrier ribbon 7 is separated away from the recording paper 2 at any time during the period between the timings t2 and t3, and even though at this time that portion **9*x* of the ink layer 9 has not yet been solidified or is in a generally half-way melted state, that portion 9*x* of the ink layer 9 remains adhering to the base film 8 and will not be transferred onto the recording paper 2**.

Figure 3B:
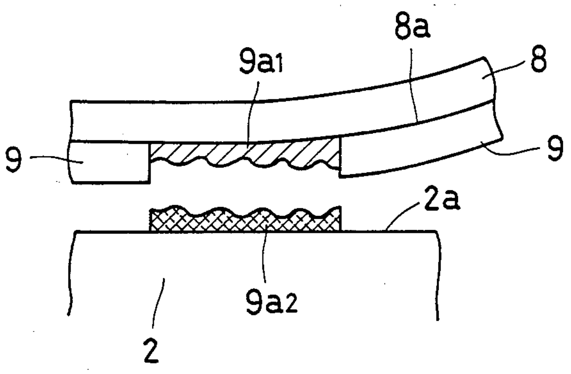
Figure 4A:
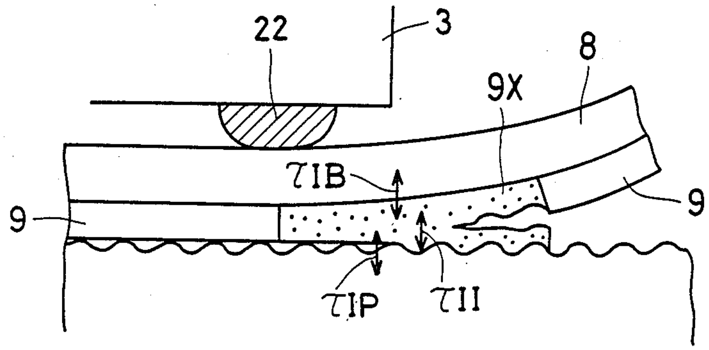
FIGS. 4*a* and 4*b* are explanatory diagrams showing the thermal transfer of a portion of the ink layer according to the present invention when the recording medium is used in the form of a paper having a relatively rough surface.
Figure 4B:
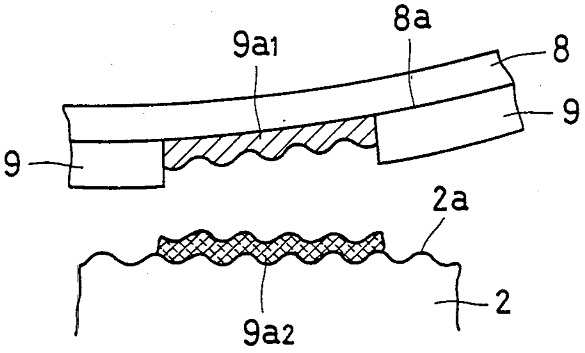

On the other hand, during a period between the timings t3 and t4, the cohesive force $\tau$ II becomes smaller than the adhesive force $\tau$ IP acting between the ink layer and the recording paper and, at the same time, smaller than the adhesive force $\tau$ IB acting between the ink layer and the base film. If the length of ink carrier ribbon 7 is separated away from the recording paper 2 when this condition is established, that is, at any time during the period between the timings t3 and t4, that fused portion of the ink layer 9 is in part transferred onto the recording paper 2 to form an ink deposit, as indicated by **9*a*2 in FIG. 3*b*, and in part retained by the base film 8 while forming an ink residue as indicated by 9*a*1 in FIG. 3*b*. Prior to this thermal transfer taking place, as best shown in FIG. 3*b*, the thickness of that portion 9*x* of the ink layer 9 is, as the length of ink carrier ribbon 7 is progressively separated away from the recording paper 2, substantially split into two halves which would eventually form the ink residue 9*a*1 and the ink deposit 9*a*2**, respectively.

As hereinabove described, only when the respective relationships of $\tau \text{ II} < \tau \text{ IP}$ and $\tau \text{ II} < \tau \text{ IB}$ are simultaneously satisfied, that portion **9*x* of the ink layer 9 can be split into two halves with its cohesive force substantially destroyed progressively and can therefore be in part transferred onto the recording paper 2 to form the ink deposit 9*a*2 and in part retained by the base film 8 as the ink residue 9*a*1**.

Figure 9:
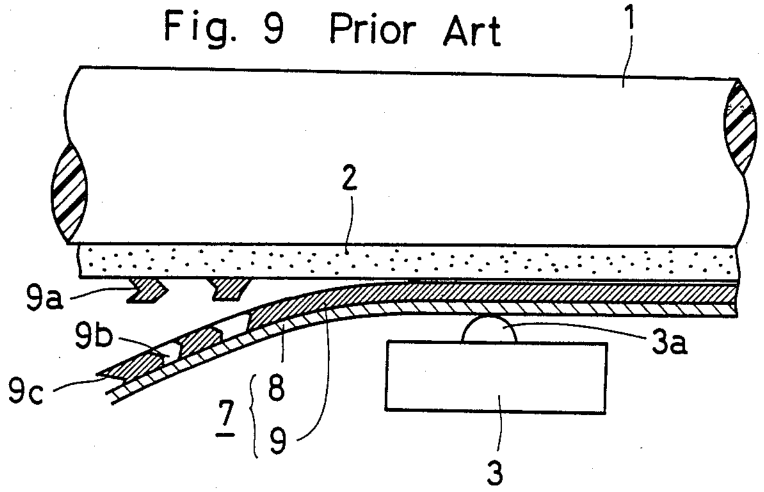
Fig. 9 Prior Art
FIG. 9 is a view similar to FIG. 2, showing how the ink layer is transferred onto the receiving medium according to the prior art.
Figure 10A:
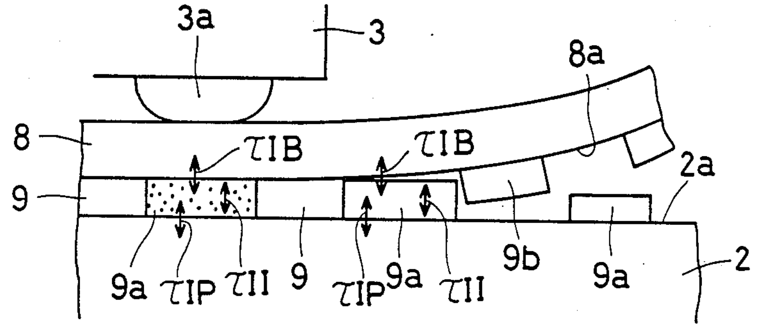
Fig. 10a Prior Art
FIGS. 10*a* and 10*b* are explanatory diagrams similar to FIGS. 3*a* and 4*a*, showing the thermal transfer of a portion of the ink layer according to the prior art when the recording medium is used in the form of a paper having a smooth surface.
Figure 10B:
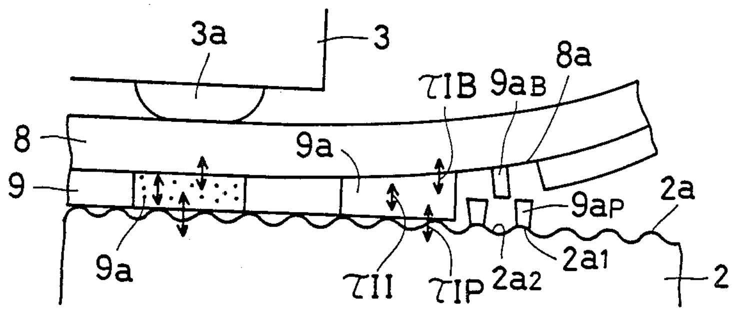
Fig. 10b Prior Art
Figure 10C:
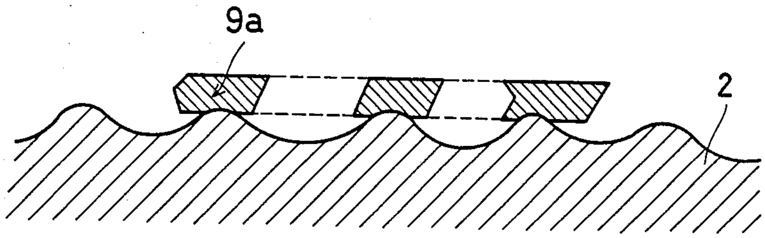
Fig. 10c Prior Art
FIG. 10*c* is a schematic sectional view showing that portion of the ink layer having been transferred onto the rough surface of the recording paper according to the prior art.
Figure 11:
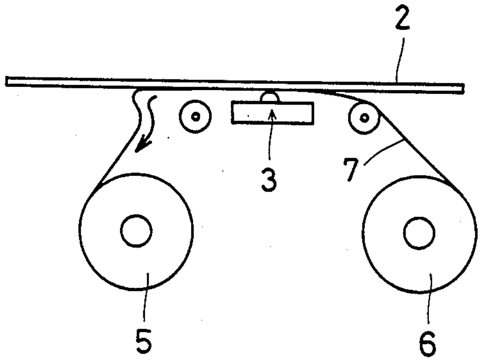
Fig. 11 Prior Art
FIG. 11 is a schematic diagram showing the slackening of the length of ink carrier ribbon which takes place during the high speed printing according to the prior art.

During a period subsequent to the timing t4 at which the temperature of that portion **9*x* of the ink layer 9 is decreasing, and if the length of ink carrier ribbon 7 is allowed to separate away from the recording paper 2, in a manner as shown in FIG. 2, at the timing at which the cohesive force $\tau$ II acting internally of the ink layer 9 becomes greater than the adhesive force $\tau$ IB acting between that portion 9*x* of the ink layer 9 and the base film 8 and smaller than the adhesive force $\tau$ IP acting between the ink layer 9 and the recording paper, the interface separation of that portion 9*x* from the base film 8 such as discussed with reference to FIG. 9 takes place even though that portion of the ink layer 9** has not yet been solidified or in a substantially halfway melted state.

Even where the recording paper 2 is a paper having a relatively coarse surface of smoothness of about several seconds as measured according to JIS, that portion **9*x* of the ink layer 9 ready to be transferred adheres in part of the recording paper 2 and in part to the base film 8 in a manne similar to that described in connection with the highly smooth recording paper 2, as can be understood from FIGS. 6*a* and 6*b*. Specifically, when, during a period between the timings t3 and t4, the cohesive force $\tau$ II becomes smaller than the adhesive force $\tau$ IP acting between the ink layer and the recording paper and, at the same time, smaller than the adhesive force $\tau$ IB acting between the ink layer and the base film, that is, when during that period the relationships of $\tau \text{ II} < \tau \text{ IP}$ and $\tau \text{ II} < \tau \text{ IB}$ are simultaneously established, that portion 9*x* of the ink layer 9 can be split into two halves with its cohesive force substantially destroyed progressively and can therefore be in part transferred onto the recording paper 2 to form the ink deposit 9*a*2 and in part retained by the base film 8 as the ink residue 9*a*1 as shown in FIGS. 3*a* and 3*b***.

Figure 5A:
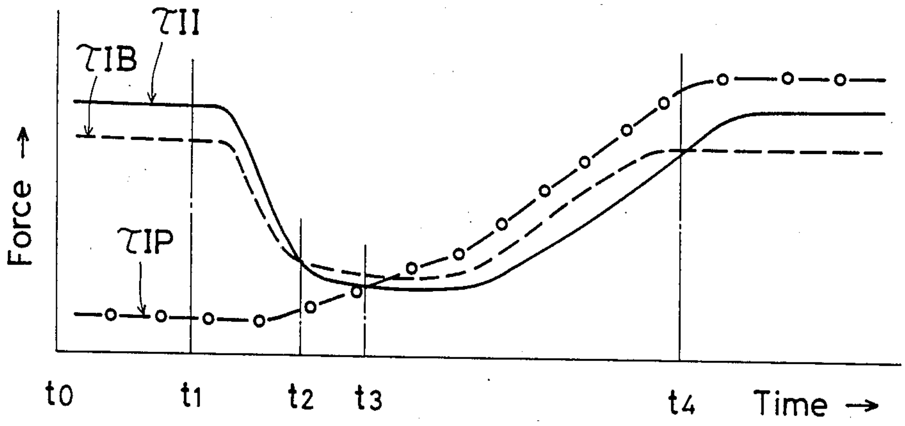
FIGS. 5*a* and 6*a* are characteristic graphs showing the relationships of various forces over time when the recording paper having a smooth surface and that having a rough surface are used, respectively.
Figure 5B:
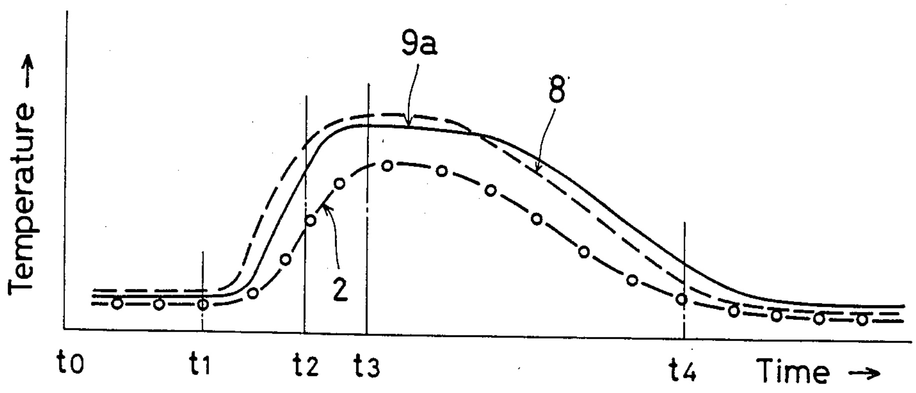
FIGS. 5*b* and 6*b* are characteristic graphs showing the relationships of temperatures of the recording paper, a base film of an ink carrier ribbon and an ink layer with time subsequent to the heating of a heating element of a thermal print head, when the recording paper having the smooth surface and that having the rough surface are used, respectively, FIGS. 5*a* to 6*b* being utilized to explain the principle of the present invention.
Figure 6A:
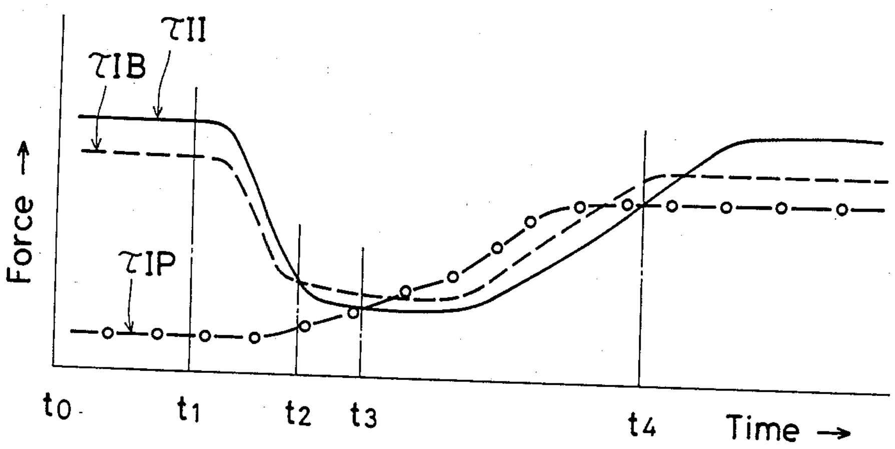
Figure 6B:
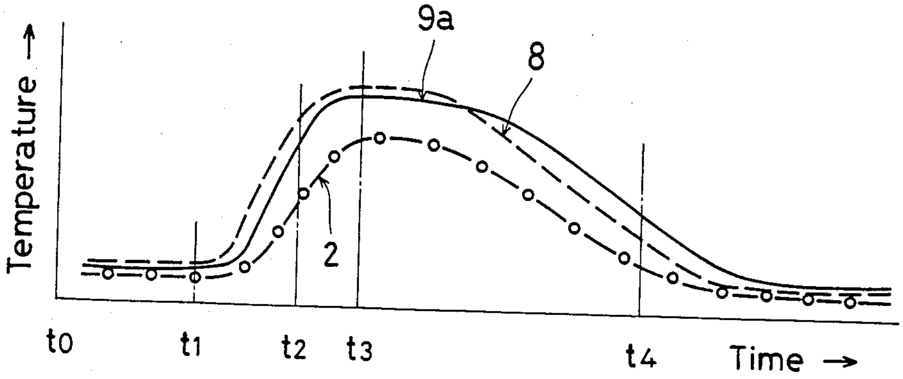
Figure 7A:
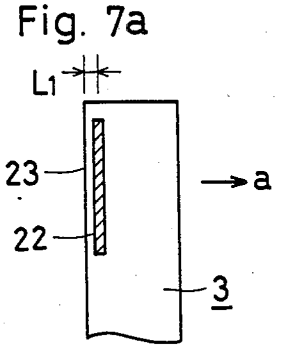
FIGS. 7*a* and 7*b* are schematic front elevational views of different types of the thermal print heads utilizable in the practice of the present invention, respectively.
Figure 7B:
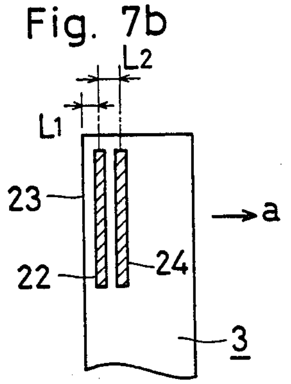

The graphs shown in FIGS. **5*b* and 6*b* illustrates changes in temperature of the recording paper 2, that portion of the base film 8 which is then aligned with the heating element 22 of the thermal print head 3 and that portion 9*x* of the ink layer 9, which take place subsequent to the heating effected by the heating element 22 during the period between the timings t0 and t1, which graphs are depicted in timed relationship with the graphs of FIGS. 5*a* and 6*a***, respectively.

Thus, the transfer of that portion **9*x* of the ink layer 9 according to the present invention is characterized in that the cohesive force acting to hold ink molecules together in that portion 9*x* of the ink layer 9 is substantially destroyed to permit the thickness of that portion of the ink layer 2 to be split into generally two halves only when the particular relationship is established. In view of this, not only can the high quality print be obtained without being substantially affected by the quality of the recording paper used and without being substantially accompanied by the lack of clarity, but also the length of ink carrier ribbon 7 once used can be used for the next succeeding printing operations because during the initial printing operation only a portion of the ink layer 9 corresponding to a generally half of the thickness of the ink layer 9** is consumed as hereinbefore described.

Moreover, since during the transfer taking place according to the present invention that portion **9*x* of the ink layer 9 is in a generally halfway melted state exhibiting a relatively low viscosity, the force required to release that portion 9*x* of the ink layer 9 from the base film 8** can be minimized to permit the high speed printing to be advantageously accomplished.

For this purpose, it is recommended to use the length of ink carrier ribbon having the ink layer over the entire length thereof, which ink layer is of a type capable of exhibiting a melt viscosity within the range of, for example, 50 to 2,000,000 cps, preferably 500 to 200,000 cps, and more preferably 2,000 to 50,000 cps, when heated by the heating element 22 and also of a type made of an ink composition having a supercooling characteristic enough to retain this melt viscosity for a relatively long time.

The platen 1, cylindrical in shape is, utilizable in the practice of the present invention for backing up the recording paper 2 to permit the thermal print head, when in the operative position, to contact the recording paper and may be of a construction having either a single layered structure or a multiple layered structure with each layer being made of natural or synthetic rubber or any other synthetic elastic material. In either case, it is recommended to use the platen 1 having its outer peripheral surface having a relatively low thermal conductivity, for example, within the range of 0.02 to 0.10 Kcal/m$^2$.hr.°C. so that the Joule heat emitted from the thermal print head 3, which would be transmitted to the platen 1 through the ink carrier ribbon 7 and then through the recording paper, will not be substantially absorbed by the platen 1.

Alternatively, if arrangement is made to heat the recording paper 2 through the platen 1 to a temperature lower than the melting temperature of the ink layer 9, the actual printing with the recording paper 2 so heated would result in the capability of a high speed printing with improved print quality. In such case, the electric power of the drive signal applied to the heating element 22 can be advantageously reduced with the consequence that the lifetime of the thermal head 3 used in the printer can be prolonged.

As is well known to those skilled in the art, the thermal print head is generally rectangular in shape having one end mounted on the carriage 4 (FIG. 1) for movement between the inoperative and operative positions and the other end formed with the heating element 22 so as to extend a predetermined distance in a direction parallel to the longitudinal axis of the thermal print head 22. In order to optimize the method herein disclosed according to the present invention, as best shown in FIG. **7*a*, it is recommended that the distance L1 between the heating element 22 and one 23 of the opposite side edges of the thermal print head 3 located on the trailing side with respect to the direction of travel of the length of ink carrier ribbon 7 shown by the arrow a is of a value equal to or smaller than 2.8 mm. In other words, the heating element 22 is preferably positioned at a location on the thermal print head 3 spaced from the trailing edge 23** a distance equal to or smaller than 2.8 mm.

Where the thermal print head 3 employs two heating elements 22 and 24 extending parallel to each other and also to the longitudinal axis of the thermal print head 3 such as suggested in the previously mentioned S. Ando et al. paper, the trailing heating element 22 is preferably spaced the distance L1 from the trailing edge 23 of the thermal print head 3 while the heating elements 22 and 24 are spaced from each other a distance L2 which is equal to or smaller than 2.8 mm, as shown in FIG. **7*b***.

In addition, it is preferred that, as shown in FIG. 2, the angle $\theta$ of separation defined between the plane of the recording paper 2 and a leading portion of the length of ink carrier ribbon 7 (with respect to the direction of travel of the length of ink carrier ribbon 7 being taken up) which detaches from the leading edge of the thermal print head 3 (with respect to the direction of travel of the ink carrier ribbon 7) so as to move in a direction away from the recording paper 2 be not smaller than 30°, preferably within the range of 30° to 65°.

It has been found that, where the heating element 22 is so positioned as to be spaced the specified distance L1 from the trailing edge of the thermal print head 3 while the angle $\theta$ of separation is selected to be within the specified range, that leading portion of the length of ink carrier ribbon 7 can be assuredly separated away from the recording paper 2 and, therefore, a smooth winding of the length of ink carrier ribbon 7 being taken up will not be disturbed thereby permitting the high speed printing capability.

Also, it is preferred that the heating element 22 is, when the thermal print head 3 is moved from the inoperative position to the operative position, brought into contact with the platen 1, with the ink carrier ribbon 7 intervening therebetween, while applying a pressing force of not smaller than 2 kg/cm$^2$ to the base film 8. By so doing, during the high speed printing with the use of the recording paper 2 having the surface smoothness of several seconds, that portion of the ink layer 9 fused by heat generated and transmitted from the heating element 22 can readily and satisfactorily be transferred onto the recording paper 2 without the high speed printing feature being substantially sacrificed.

From the foregoing full description of the present invention made in connection with the preferred embodiment with reference to the accompanying drawings, it has now become clear that, by causing that portion of the ink layer which is fused by the heat from the heating element of the thermal print head to be transferred partly onto the recording medium while accompanied by the substantial destruction of the cohesive force acting internally of the ink layer to hold the ink molecules together, not only can the length of ink carrier ribbon once used be used for the next succeeding printing operation or operations, but also the relatively high print quality can be accomplished. In addition, the force required to release the portion of the ink layer can be minimized so that the high speed printing can readily be accomplished.

Although the present invention has fully been described in connection with the preferred embodiment thereof with reference to the accompanying drawings used only for the purpose of illustration, those skilled in the art will readily conceive numerous changes and modifications within the framework of obviousness upon the reading of the specification herein presented of the present invention. For example, the respective characteristic curves of the cohesive force $\tau$ II acting internally of the ink layer 9, the adhesive force $\tau$ IB acting between the film base 8 and the ink layer 9, and the adhesive force $\tau$ IP acting between the ink layer 9 and the recording paper 2 may vary with the type of material and the composition of the ink layer 9, the base film 8 and the recording paper 2 used.

Accordingly, such changes and modifications are to be construed as included within the true scope of the present invention as defined by the appended claims, unless they depart therefrom.

What is claimed is:

1. A thermal transfer printing method which is performed by the use of a thermal printer including a platen for the support of a recording medium to be printed, a thermal print head having at least one heating element and a length of ink carrier ribbon with the recording medium positioned between the thermal print head and the length of ink carrier ribon, said ink carrier ribbon having a base film and an ink layer, which method comprises the steps of:

- pressing the ink carrier ribbon relatively against the platen by means of the thermal print head with the ink layer brought in contact with the recording medium;
- electrically energizing the heating element to emit heat to cause that portion of the ink layer, which is aligned with the heating element, to fuse; and
- causing that portion of the ink layer so fused to partially transfer onto the recording medium when a cohesive force acting internally of the ink layer becomes smaller than an adhesive force acting between the ink layer and the recording medium and, at the same time, smaller than a adhesive force acting between the ink layer and the base film, whereby said cohesive force is substantially destroyed so as to permit the thickness of the ink layer to be substantially split into halves such that one of the halves is transferred onto the receiving medium and the other of the halves remains adhering to the base film.

2. The thermal transfer printing method as claimed in claim 1, wherein the melt viscosity of that portion of the ink layer ready to be transferred is within the range of 50 to 2,000,000 cps.

3. The thermal transfer printing method as claimed in claim 2, wherein the melt viscosity is within the rane of 500 to 200,000 cps.

4. The thermal transfer printing method as claimed in claim 2, wherein the melt viscosity is within the range of 2,000 to 50,000 cps.

5. The thermal transfer printing method as claimed in claim 2, wherein the ink layer has a supercooling property effective to permit that portion of the ink layer so fused to remain in a melted state exhibiting a low viscosity for a prolonged time.

6. The thermal transfer printing method as claimed in claim 1, wherein said heating element is arranged parallel to and along a trailing edge of the thermal print head with respect to the direction of transportation of the length of ink carrier ribbon.

7. The thermal transfer printing method as claimed in claim 6, wherein the heating element is spaced a distance of about 2.8 mm from the trailing edge of the thermal print head.

8. The thermal transfer printing method as claimed in claim 1, wherein two heating elements are employed in the thermal print head, said two heating elements being arranged parallel to each other and also parallel to and along a trailing edge of the thermal print head with respect to the direction of transportation of the length of ink carrier ribbon.

9. The thermal transfer printing method as claimed in claim 8, wherein one of the heating elements adjacent the trailing edge of the thermal print head is spaced a distance of about 2.8 mm from the trailing edge of the thermal print head and the other of the heating element is spaced a distance of about 2.8 mm from said one of the heating elements.

10. The thermal transfer printing method as claimed in claim 1, wherein the angle of separation defined between the plane of the recording paper and a leading portion of the length of ink carrier ribbon, with respect to the direction of travel of the length of ink carrier ribbon being taken up, which detaches from the leading edge of the thermal print head, with respect to the direction of travel of the ink carrier ribbon, so as to move in a direction away from the recording paper is selected to be not smaller than 30°.

11. The thermal transfer printing method as claimed in claim 10, wherein the angle of separation is within the range of 30° to 65°.

12. The thermal transfer printing method as claimed in claim 1, wherein the platen is cylindrical in shape and has at least its outer peripheral surface made of hard material and having a low thermal conductivity, and wherein the thermal print head is supported for movement between an inoperative position, in which the heating element is spaced a distance from the recording medium, and an operative position in which the heating element presses the ink carrier ribbon against the platen, said pressing step being carried out by causing the thermal print head to move from the inoperative position to the operative position.

13. The thermal transfer printing method as claimed in claim 12, wherein the thermal conductivity is within the range of 0.02 to 0.10 $Kcal/m^2$ .hr.°C.

14. The thermal transfer printing method as claimed in claim 1, further comprising a step of heating the recording medium to a temperature lower than the temperature at which that portion of the ink layer is fused.

15. The thermal transfer printing method as claimed in claim 2, further comprising a step of heating the recording medium to a temperature lower than the temperature at which that portion of the ink layer is fused.

16. The thermal transfer printing method as claimed in claim 5, further comprising a step of heating the recording medium to a temperature lower than the temperature at which that portion of the ink layer is fused.

* * * * *